US006509865B2

(12) United States Patent
Takai

(10) Patent No.: US 6,509,865 B2
(45) Date of Patent: Jan. 21, 2003

(54) ADAPTIVE ANTENNA DEVICE OPERABLE IN ACCORDANCE WITH DIFFERENT ALGORITHMS

(75) Inventor: Kenichi Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/779,472

(22) Filed: Feb. 9, 2001

(65) Prior Publication Data

US 2001/0020918 A1 Sep. 13, 2001

(30) Foreign Application Priority Data

Feb. 10, 2000 (JP) ....................................... 2000-033882

(51) Int. Cl.[7] ................................................ G01S 13/00

(52) U.S. Cl. ........................... 342/158; 342/14; 342/16; 342/368; 342/372; 342/378

(58) Field of Search ................................ 342/373, 372, 342/368, 157, 158, 14, 16, 378

(56) References Cited

U.S. PATENT DOCUMENTS 6,128,276 A * 10/2000 Agee .......................... 370/208
6,144,652 A * 11/2000 Avidor et al. ............... 370/336
6,173,014 B1 * 1/2001 Forssen et al. ............. 375/267

FOREIGN PATENT DOCUMENTS

JP 11-251986 9/1999

* cited by examiner

*Primary Examiner*—Theodore M. Blum
(74) *Attorney, Agent, or Firm*—McGinn & Gibb, PLLC

(57) ABSTRACT

In an adaptive antenna device having directivity pattern generators operable in accordance with different algorithms, respectively, in a baseband modem, beam steering processing, null steering processing, and estimating processing of an arrival direction are executed in parallel to one another. Parameters resulting from the beam and the null steering processing are controlled by processing results of the estimating processing and are weighted and combined to individually generate directivity patterns based on the different algorithms.

16 Claims, 15 Drawing Sheets

ADAPTIVE ANTENNA DEVICE OPERABLE IN ACCORDANCE WITH DIFFERENT ALGORITHMS

BACKGROUND OF THE INVENTION

This invention relates to an adaptive antenna device for use in a mobile communication system and, in particular, to a control method of an adaptive antenna device used in a cellular system which adopts a CDMA (code division multiple access) method.

As well known in the art, radio communication is carried out by using, as a medium, radio waves that propagate a free space. This inevitably brings about interference between a desired radio wave to be received by a desired terminal and the other radio waves to be received by the other terminals except the desired terminal. Consequently, a fundamental problem takes place such that quality of communication is indispensably reduced in both the desired radio wave and the other radio waves.

In order to solve the above-mentioned problem and to effectively utilize a radio frequency resource, consideration is made about a multiple access communication method which can not only avoid the interference but also can carry out communication among a plurality of terminals. Such a multiple access communication method may be, for example, a frequency division multiple access (FDMA) method, a time division multiple access (TDMA) method, and a code division multiple access (CDMA) method.

In either one of the multiple access communication methods, communication can be ideally carried out among a plurality of terminals without interference. However, propagation environments are actually drastically changed with time and frequency utilization efficiency should be technically improved in the practical communication in a technical viewpoint. Such a change of propagation environments and a technical requirement of improving the frequency utilization efficiency give rise to incompleteness of practical communication conditions and consequently brings about any interference.

Among the above-mentioned multiple access communication methods, the CDMA method assigns, to each communication terminal, a peculiar orthogonal code (or pseudonoise) which has self-correlation and low cross correlation and which can be discriminated. With the CDMA method, all of the communication terminals can use the same frequency in common by distinguishing each code from one to another.

Herein, consideration is made about a mobile communication system which has movable communication terminals. In this event, each communication terminal is moved under environments or conditions that are rapidly and incessantly varied. Under the rapidly and incessantly varied conditions, the code tends to be vulnerable in orthogonality and to deteriorate quality of communication due to interference among the codes. Therefore, when the CDMA method is adopted to the mobile communication, techniques are inevitably required about transmission power control for keeping interference uniform or constant and about rake receiving and path capturing for effectively utilizing a plurality of multi-path propagation waves having different delay times.

On the other hand, recent attention has been focused on an adaptive antenna that is aimed at improving quality of communication and frequency utilization efficiency in a mobile communication system of the CDMA method.

Herein, the adaptive antenna is formed such that a plurality of antenna elements are regularly arranged to form a spatial filter and are given reception waves which have amplitudes and phases different from one another, respectively. In addition, the reception waves are controlled by giving weights such that amplitudes and phases of the reception waves become appropriate. Specifically, an antenna gain is adaptively varied with time in consideration of propagation environments so that the antenna gain becomes high in a direction of an aimed communication terminal and becomes low in a direction of an interference wave of a high level.

In the mobile communication system of the CDMA method, spatial separation is realized by adaptively controlling directivity of the adaptive antenna with this method, it is possible to reduce displacement of orthogonality in codes received by the plurality of the communication terminals which communicate through the same frequency and to therefore decrease interference between the codes. As a result, the frequency utilization efficiency can be also improved by this method.

In the meanwhile, it should be considered in the mobile communication system that the propagation environments are rapidly varied while each communication terminal is moving. In order to trace or follow such rapid variation of the propagation environments, requirements are made about capturing accurate propagation information and about very high speed performance of processing the propagation information. Recent researches enable high speed simulation. However, it is practically difficult to implement the processing performance matched with the high speed simulation. In addition, it is necessary to apply a directivity control method suitable for each propagation environment.

As a directivity control method, both a beam steering control method and a null steering control method are known in the art and will be simply often called beam steering control and null steering control below, respectively.

The beam steering control is for generating a plurality of beams partially overlapped with each other to control the beams so that a main one of the beams is directed to an aimed communication terminal. With the beam steering control, it is possible to cover a wide angle by increasing the beams in number, so as to cope with a variation of a propagation characteristic. However, the possibility that a superfluous radio wave is often picked up becomes high with an increase of the beams and the adaptive antenna becomes low in performance. Although consideration may be made about using a high speed adaptive algorithm responding to a rapid variation of a propagation characteristic, such an algorithm can not be easily implemented, as mentioned before.

On the other hand, the null steering control is for generating a wide beam which has null points directed to directions of receiving interference waves. At the null points, an antenna gain is drastically attenuated. However, an antenna gain tends to be lowered in a direction of a desired wave also in the null steering control.

In Japanese Unexamined Patent Publication No. Hei. 11-251986, namely, 251986/1999, proposal has been made about an adaptive antenna device which has a plurality of antenna elements, a first pattern forming unit for forming a first directivity pattern in a first direction, and a second pattern forming unit for forming a second directivity pattern in a second direction orthogonal to the first direction. Herein, it is to be noted that each of the first and the second forming units is operable in accordance with the same algorithm. With this structure, when either one of the first and the second directivity patterns exhibits an excellent characteristic, the remaining one of the first and the second directivity patterns exhibits an extremely bad characteristic because no correlation is present at all between the first and the second directivity patterns. The adaptive antenna device is disadvantageous in that it can not favorably follow a rapid variation of an arrival direction of the desired wave within a small angle less than 90°.

SUMMARY OF THE INVENTION

It is an object of this invention to provide an adaptive antenna device which is capable of coping with a rapid change of propagation environments without a reduction of performance.

It is another object of this invention to provide an adaptive antenna device of the type described, which can compensate defects of both beam steering control and null steering control.

It is still another object of this invention to provide a method of controlling an adaptive antenna device, which is capable of favorably following a rapid variation of an arrival direction of a desired wave. With an interference wave or a jamming wave suppressed.

It is yet another object of this invention to provide a method of the type described, which is capable of mitigating an influence of an instantaneous variation.

An adaptive antenna device to which this invention is applicable comprises a plurality of antenna arrays and a base station apparatus coupled to the antenna arrays. Each of the antenna arrays has a plurality of antenna elements spatially arranged. According to an aspect of this invention, the base station apparatus comprises combining means for forming a directivity pattern which is combined by varying an amplitude and a phase of each radio signal received by and transmitted from the antenna elements so that radio energy is increased towards a designated range and a designated direction of a communication radio wave and is cancelled in parallel towards a range and a direction of a jamming wave. The combining means comprises beam steering antenna pattern control means for forming a narrow beam to control an antenna gain so that a maximum portion of the antenna gain is directed to a received direction of the communication radio wave, null steering antenna pattern control means for carrying out a control operation such that an antenna gain has a null portion direct a received direction of the jamming wave and concurrently has a high gain portion of the antenna gain direct the received direction of the communication radio wave, and weighting means for weighting a received signal in accordance with a beam obtained by the beam steering antenna pattern control and with a beam obtained by the null steering antenna steering control.

Herein, each of the beam steering antenna pattern control means comprises arrival direction estimation means for performing each of the beam steering antenna pattern control and the null steering antenna pattern control simultaneously or in a time division fashion at a very small time interval, so as to estimate a direction of a desired wave from different amplitudes and phases of the received radio waves received from the plurality of the antenna arrays and to produce results of the estimation. The results of the estimation are defined as an angle profile which is representative of parameter information of the beam steering and the null steering antenna pattern control means.

Specifically, the beam steering antenna pattern control means comprises reception means for receiving, as control information, parameters which include a beam width in question and an angle profile for determining the direction of the beam and which selectively include a previous beam width and a previous angle profile referenced only when control operation is consecutively carried out from the past and means for attaining the antenna pattern on the basis of the control information. On the other hand, the null steering antenna pattern control means comprises receiving means for receiving, as control information, parameters which include an angle profile for determining a beam direction and a previous angle profile which is referenced only when control operation is consecutively carried out from the past and means for attaining the antenna pattern on the basis of the control information.

In addition, the base station apparatus further comprises comparing means for comparing, with each of predetermined threshold levels, each of a reception signal received through a beam patterned by the beam steering directivity control and another reception signal received through a beam patterned by the null steering directivity control, to produce a result signal representative of a result of comparison, combining means for combining the reception signal and another reception signal after each of the reception signal and another reception signal is weighted only when each signal exceeds the predetermined threshold level, and repeating means for repeating the combining operation after delay time processing is carried out to delay a predetermined time.

According to another aspect of this invention, the base station apparatus comprises a first directivity pattern generator, operable in accordance with a first algorithm, for generating a first beam which has a first directivity pattern determined by the first algorithm, a second directivity pattern generator, operable in accordance with a second algorithm different from the first algorithm, for generating a second beam which has a second directivity pattern determined by the second algorithm, and a combining unit for combining the first beam with the second beam to form a combined directivity pattern. The first algorithm and the second algorithm are used for executing beam steering control and null steering control, respectively.

In addition, the base station apparatus further comprises a third directivity pattern generator for carrying out receiving operation of a received signal in accordance with the first algorithm to produce a first processed signal, a fourth directivity pattern generator for carrying out receiving operation of the received signal in accordance with the second algorithm to produce a second processed signal, and a control unit for controlling the third and the fourth directivity pattern generators so that the first and the second processed signals become optimum in phases and amplitudes.

According to still another aspect of this invention, a method is for use in controlling an adaptive antenna device and comprises the steps of generating a first beam of a first directivity pattern in accordance with a first algorithm, generating a second beam of a second directivity pattern in accordance with a second algorithm different from the first algorithm, combining the first and the second beams to produce a combined beam of a combined directivity pattern, and controlling the combined directivity pattern in consideration of an arrival direction of a desired wave and arrival directions of jamming waves.

The first algorithm is determined for beam steering control while the second algorithm is determined for null steering control.

DESCRIPTION OF THE PREFERRED EMBODIMENT

Figure 1:
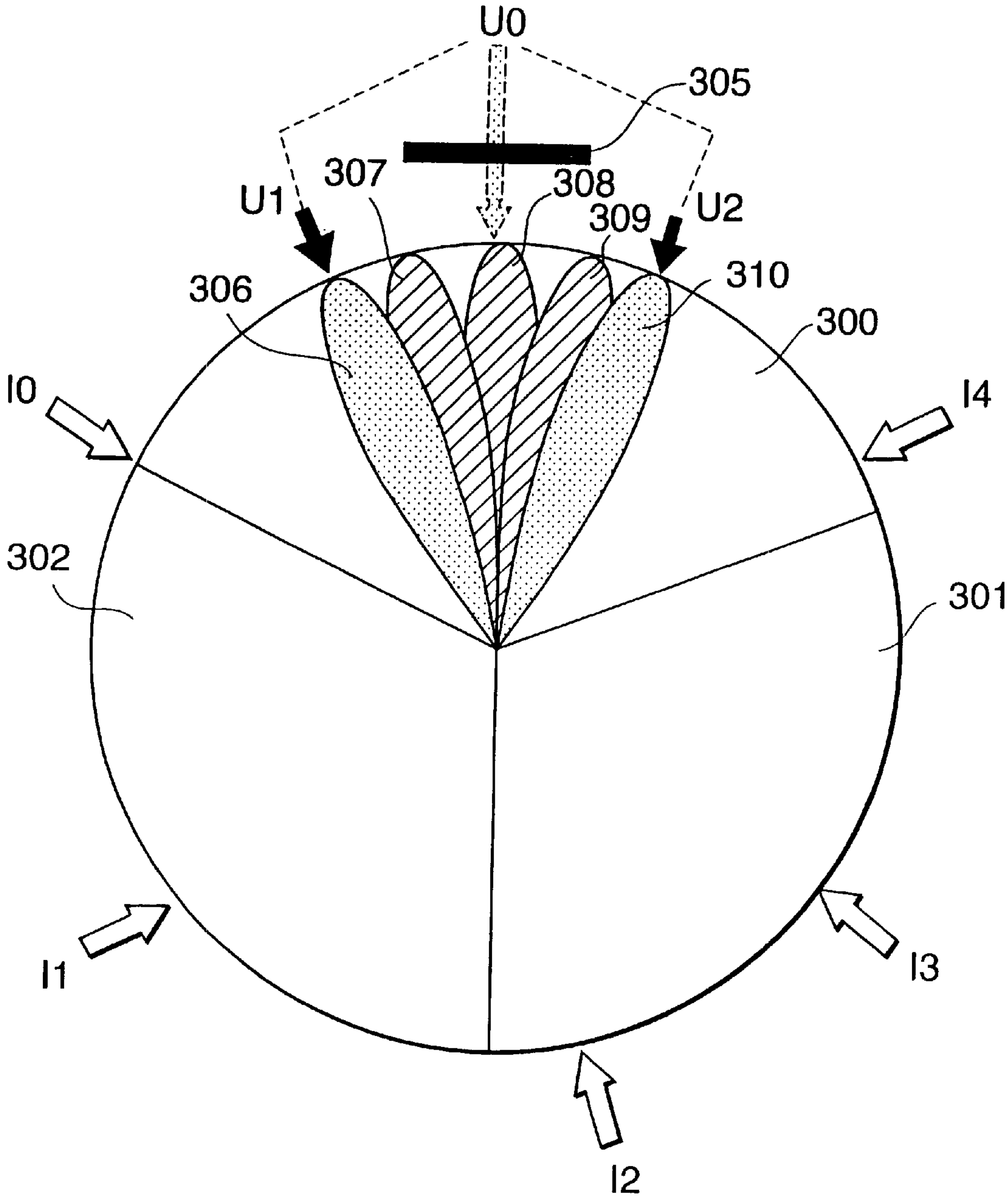
FIG.1 PRIOR ART
FIG. 1 diagrammatically shows an antenna directivity pattern which is formed by a base station which is operated in accordance with conventional beam steering control and which is used in a mobile communication system.

Referring to FIG. 1, description will be made about a conventional mobile communication system which adopts beam steering control and which is specified by an antenna directivity characteristic of a base station used in the mobile communication system. In FIG. 1, it is assumed that the base station is located at a center of a service area illustrated by a circle. The illustrated service area may be called a cell and is divided into a plurality of sectors, namely, three sectors designated by 300, 301, and 302 in FIG. 1.

In addition, it is surmised that a communication terminal (not shown) is present in the sector 300 in FIG. 1 and that an obstacle 305 is placed between the communication terminal and the base station, as shown in FIG. 1. When the obstacle 305 is not placed, a desired wave transmitted from the communication terminal is received in a direction which is depicted by U0 in FIG. 1 and which may be referred to as an arrival direction of the desired wave. On the other hand, interference waves 10, 11, 12, and 13 are received from directions depicted by arrow heads, respectively. The beam steering control is carried out by the base station to generate a plurality of narrow beams 307, 308, and 309 within the sector 300 so as to cover the arrival direction U0 of the desired wave before the obstacle 305 appears between the arrival direction U0 and the base station. When the obstacle 306 appears as shown in FIG. 1, a path from the arrival direction U0 is interrupted with the obstacle 305 and consequently the desired wave is received in FIG. 1 from different directions depicted by U1 and U2. It is noted that the directions U1 and U2 are not covered by the narrow beams 307, 308, and 309, as illustrated in FIG. 1.

Generally, when the adaptive antenna device is operated under the beam steering control, each beam has a narrow beam width (3 dB decreasing point) within an angle of 10° and is azimuthally shifted with each beam partially overlapped with each other, so as to obtain a diversity effect. Since only three beams are used in the illustrated system, it is readily understood that the arrival directions U1 an U2 can not be covered with the beams 307, 308, and 309. When the arrival direction U0 of the desired wave is changed to the different directions U1 and U2, as illustrated in FIG. 1, the desired wave can not be received because the directions U1 and U2 can not be covered with the beams due to a variation of the propagation characteristic.

As illustrated in FIG. 1, new beams, such as 306 and 310, may be added to cope with the variation of the propagation characteristic and to cover a wide angle range. In this event, a superfluous radio wave may be received, as mentioned in the preamble of the instant specification.

Figure 2:
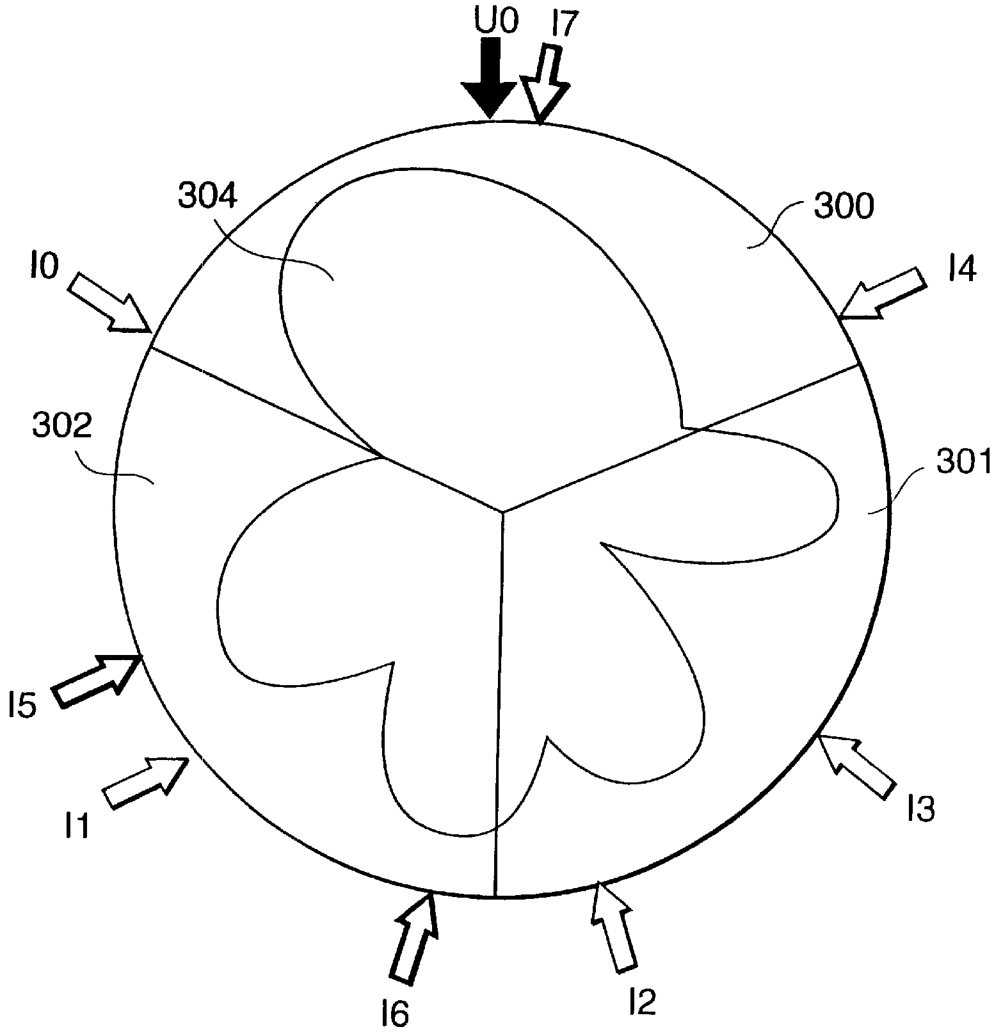
FIG.2 PRIOR ART
FIG. 2 diagrammatically shows another antenna directivity pattern which is formed by a base station which is operated in accordance with conventional null steering control.

Referring to FIG. 2, description will be made about another conventional mobile communication system which adopts null steering control and which is also specified by another antenna directivity characteristic of the base station used in the mobile communication system, like in FIG. 1. In FIG. 2, a beam 304 is generated in accordance with a null steering algorithm. An adaptive antenna device operated under the null steering control is featured by the beam 304 that has null points in arrival directions of interference waves. It is apparent from FIG. 2 that the null steering control is carried out such that an antenna gain in the antenna directivity characteristic is sharply reduced at the null points.

In FIG. 1, a desired wave is received from a desired wave direction U0. On the other hand, interference waves are at first received from interference wave directions 10, 11, 12,13, and 14 and are subsequently received from interference directions 15, 16, and 17. Under the circumstances, it is assumed that the number of the interference waves exceeds a degree of freedom determined in dependency upon the number of antenna elements. In this event, null points can not be formed by the adaptive antenna device in the interference directions 16 and 17, as is readily understood from FIG. 2.

In addition, the null steering control operation is carried out to form a null point for the interference wave from 17 adjacent to the desired wave from U0 and, as a result, the directivity gain for the desired wave from U0 is undesirably reduced as shown in FIG. 2.

Thus, the null steering control has a disadvantage that the directivity gain of the desired wave is undesirably reduced when the number of the interference waves exceeds the degree of freedom.

Alternatively, another adaptive antenna device is also proposed which generates a main beam tracing a path, together with a backup beam (supplementary beam) which has a wide directivity. The backup beam does not need to frequently control or vary a directivity and serves to cover a range which can not be traced by the main beam. Such a backup beam may fixedly cover a whole of the sector 300

(FIG. 1) and may be a fixed beam or a semi-fixed beam. The backup beam is operated only when the adaptive antenna device can not follow or trace the desired wave.

With this adaptive antenna device, the backup beam is used very often in the mobile communication when system performance is estimated over a long term. This is because the propagation environments are always rapidly and drastically varied in the mobile communication. In consequence, the performance of the adaptive antenna device is deteriorated in inverse proportion to a frequency of using the backup beam. For example, when the backup and the main beams are used at a rate of 30% and 70%, respectively, the performance of the adaptive antenna device is reduced by about 30% in comparison with the performance of the main beam alone.

Furthermore, it is known in the same mobile communication system that different propagation models are needed in accordance with environments and that directivity control methods have been considered which are suitable for the respective models.

Taking the above into consideration, proposal has been made about an adaptive antenna device which carries out statistical calculation related to the environments, during a receiving operation and which switches control algorithms from one to another in accordance with a plurality of propagation models. Specifically, a memory stores the plurality of the propagation models each of which is selected by a processor in accordance with the environments. Alternatively, a hardware structure may be changed in accordance with the environments from one to another by using a field programmable gate array (FPGA) or the like.

As mentioned before, it is difficult with the conventional antenna devices mentioned above to follow or trace the propagation environments which are varied every moment. Accordingly, the propagation environments are averaged in time during a short term and comprehensive directivity control is usually executed such that an averaged characteristic is included. With each conventional control method, it is possible to avoid disorder or diversion of control that might result from temporary variation of the environments. However, each control method has a shortcoming that it is difficult to quickly respond to a variation of propagation environments, such as shadowing, that is rapid and lasts for a while. In addition, the shadowing means a rapid variation of an environment which occurs when a communication terminal is moved to a shadow of a building or the like.

Moreover, since each of the propagation models is abstractive, it is very difficult to instantaneously detect a variable point of the abstractive propagation models. Further, a delay time inevitably occurs until the variable point is judged, because it is statistically obtained. A physical delay is also caused to occur so as to switch the algorithms from one to another. More specifically, the beam steering control has the disadvantage that it is weak against a rapid variation of the propagation environments, such as the shadowing, while the null steering control has the shortcoming that adaptability is degraded when interference waves exceed the degree of freedom in the adaptive antenna device.

Figure 3:
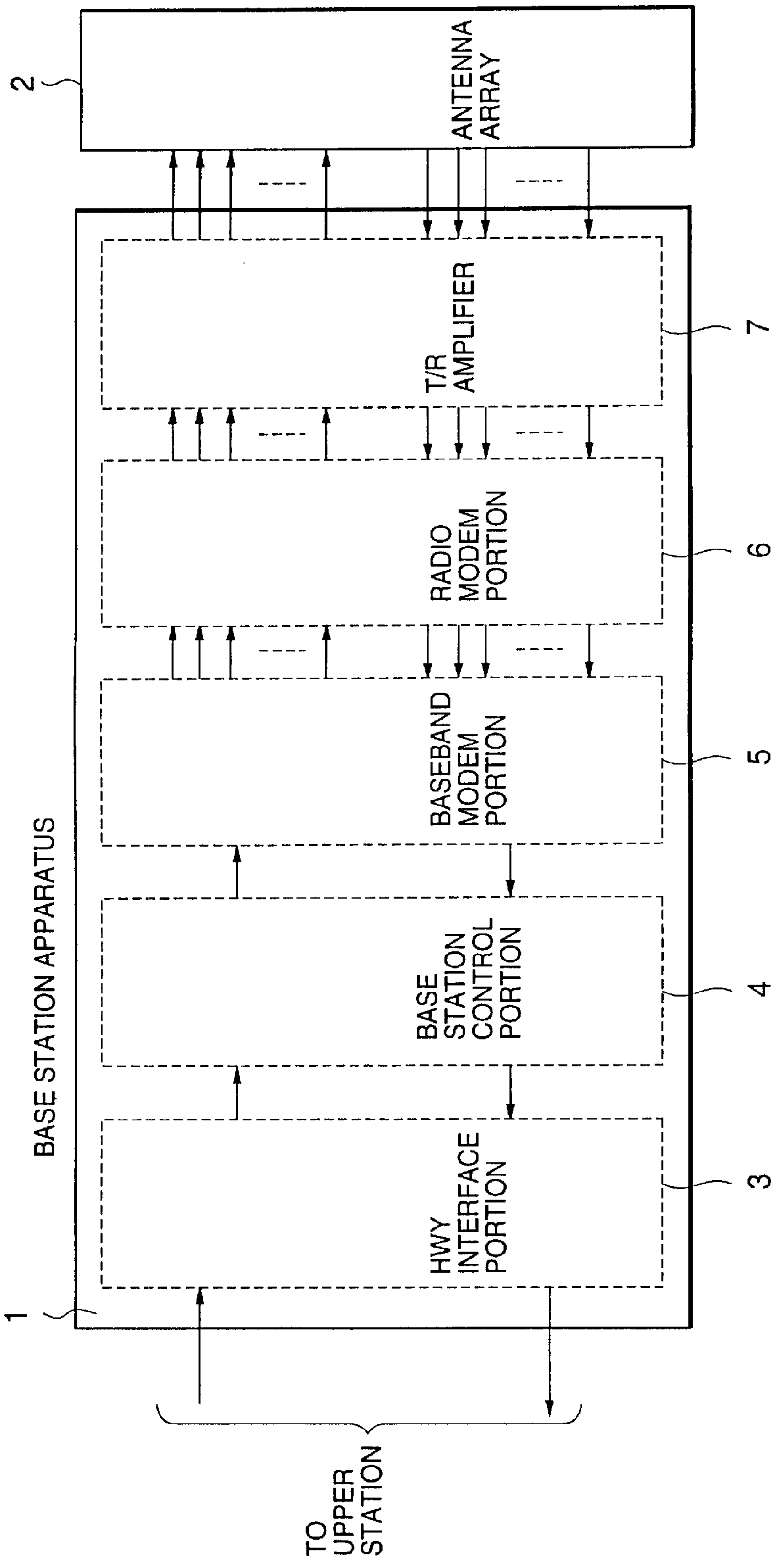
FIG. 3 shows a block diagram of a base station which is equipped with an adaptive antenna device according to this invention.

Referring to FIG. 3, description will be made about an adaptive antenna device according to a first embodiment of this invention. The adaptive antenna device illustrated in FIG. 3 is structured by a base station apparatus 1 and an antenna array 2. The adaptive antenna device 1 has a highway (HWY) interface portion 3, a base station control portion 4, a baseband modem portion 5, a radio modem 6, and a transmitter/receiver (T/R) amplifier 7. Although the HWY interface portion 3 and the base station control portion 4 are separately drawn in FIG. 3, both of them may be incorporated into a single functional block.

Now, the illustrated HWY interface portion 3 serves as a circuit interface between the base station apparatus 1 and its upper station (base station controller) (not shown). The base station control portion 4 is operable to control or monitor a whole of the base station while the baseband modem 5 serves to carry out coding/decoding and/or modulating/demodulating (primary modulating/demodulating in a system of CDMA). The radio modem 6 is operable to up-convert a signal modulated by the baseband modem 5 into a high frequency band and to down-convert a high frequency signal given from the T/R amplifier 6 into a baseband. The T/R amplifier 7 serves to amplify a transmission radio wave of the high frequency band and a reception radio wave.

Figure 4:
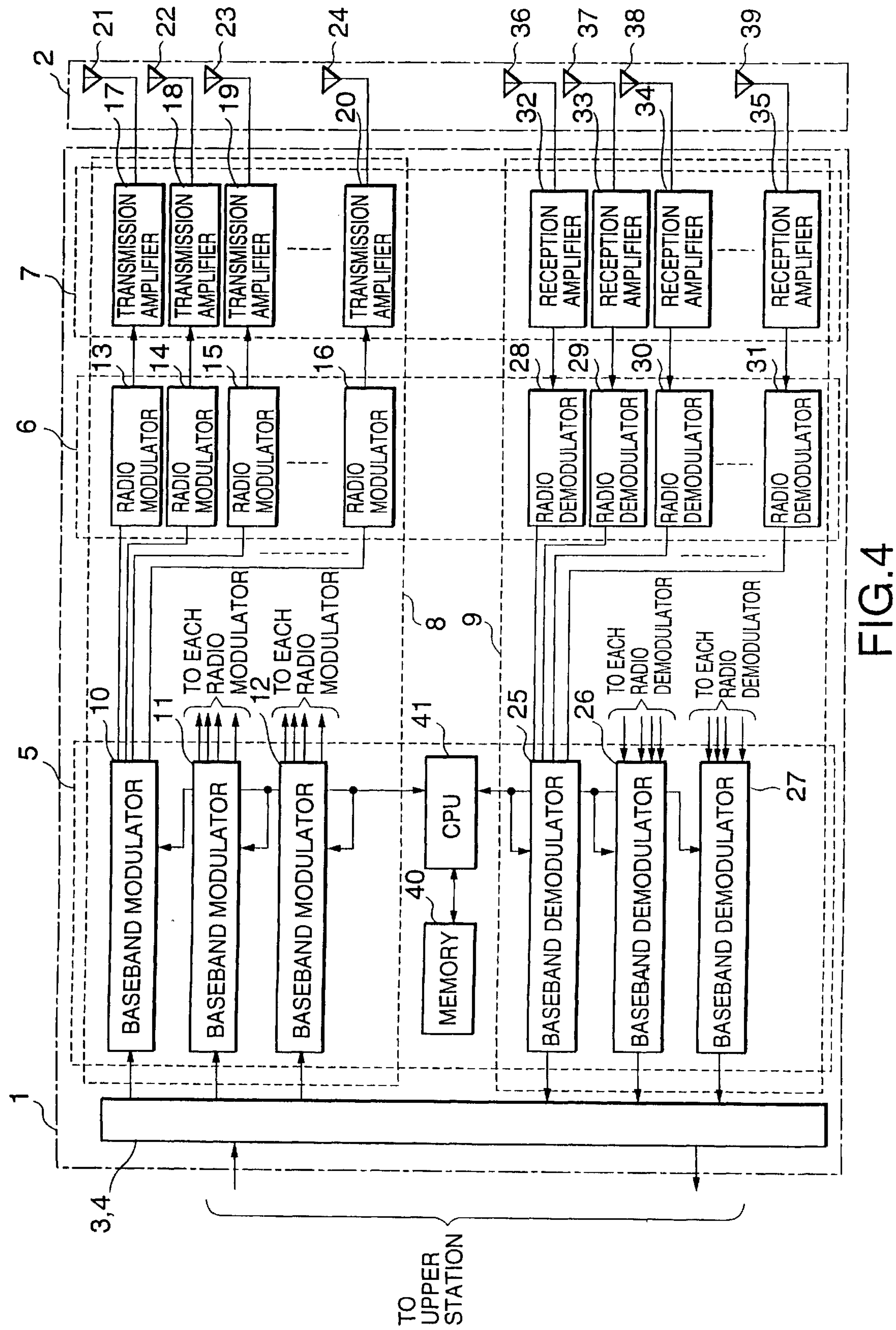
FIG. 4 shows a block diagram for use in describing the base station illustrated in FIG. 3 in detail.

Referring to FIG. 4, the base station apparatus 1 is illustrated more in detail. In FIG. 4, similar parts are designated by like reference numerals and the HWY interface portion 3 and the base station control portion 4 are collectively designated by a single block in FIG. 4 because both of them are not directly related to this invention.

The base band modem 5 illustrated in FIG. 4 has baseband modulators 10 to 12, baseband demodulators 25 to 27, a CPU 41, and a memory 40 used by the CPU 41. Although each number of the baseband modulators 10 to 12 and the baseband demodulators 25 to 27 is equal to three, it is practically determined by the number of users accommodated in the base station.

In FIG. 4, the radio modem 6 includes radio modulators 13 to 16 and radio demodulators 28 to 31. It is to be noted that the radio modulators 13 to 16 are equal in number to antenna elements of the antenna array 2 for transmission while the radio demodulators 28 to 31 are equal in number to antenna elements for reception.

The T/R amplifier portion 7 is structured by transmission amplifiers 17 to 20 and reception amplifiers 32 to 35 both of which are equal in number to the antenna elements for the transmission and the reception, respectively.

The illustrated antenna array 2 is structured by the antenna elements (depicted by 21 to 24) for transmission and the antenna elements (depicted by 36 to 39) for reception. The antenna elements 21 to 24 for transmission and the antenna elements 36 to 39 are separately drawn in FIG. 4 but they may be antenna elements which are coupled through a duplexer and which are common to transmission and reception.

From another viewpoint, the illustrated base station apparatus 1 may be divided into a transmitter section 8 and a receiver section 9. In this event, the transmitter section 8 includes the baseband modulators 10 to 12, the radio modulators 13 to 16, and the transmission amplifiers 17 to 20 while the receiver section 9 includes the baseband demodulators 25 to 27, the radio demodulators 28 to 31, and the reception amplifiers 32 to 35.

Figure 5:
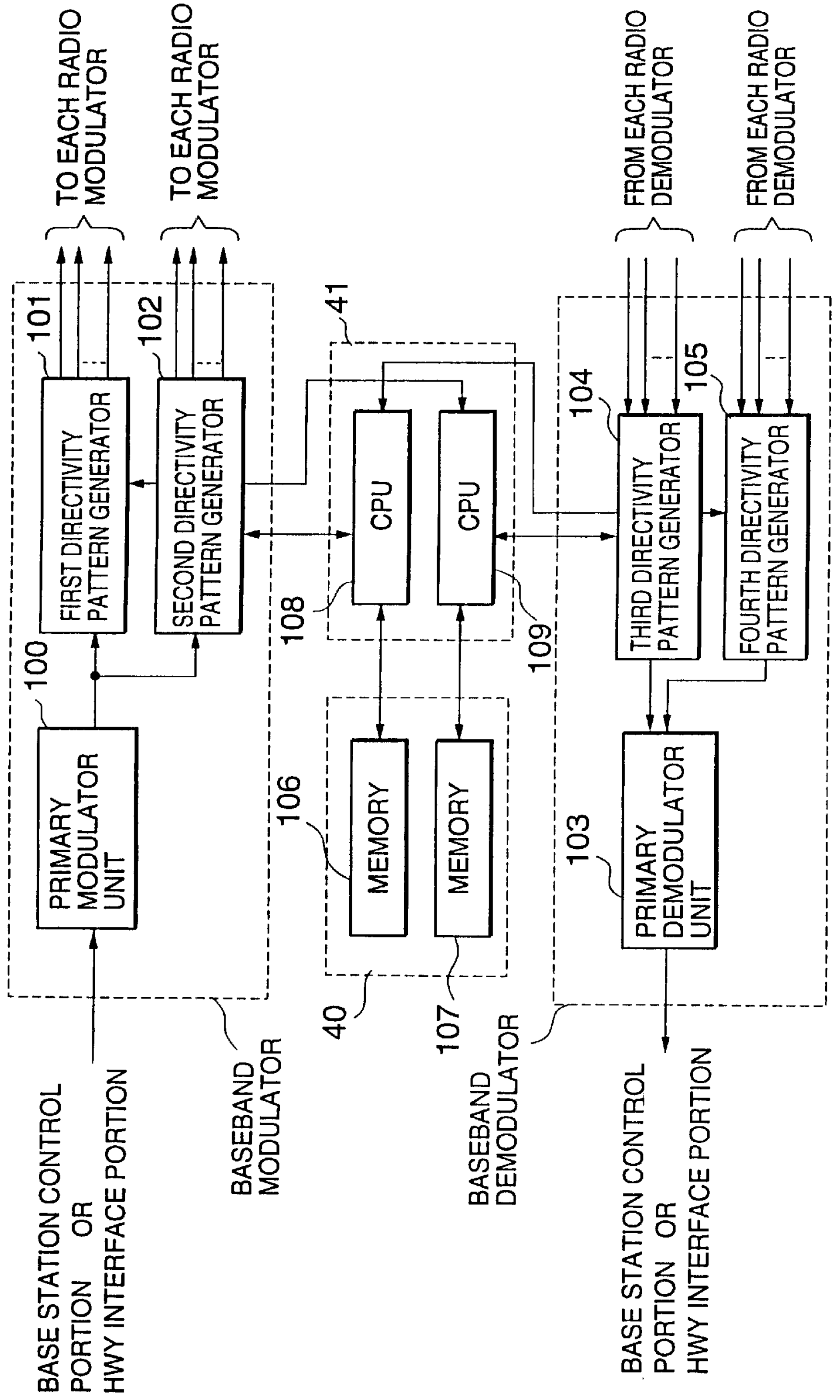
FIG. 5 shows a block diagram of a part of the base station illustrated in FIGS. 3 and 4.

Referring to FIG. 5 together with FIGS. 3 and 4, description will be made about the baseband modem 5 shown in FIGS. 3 and 4 and about the baseband modulator and baseband demodulator illustrated in FIG. 4. In FIG. 5, only a selected one of the baseband modulators (unnumbered) is shown together with a selected one of the baseband demodulators (unumbered) because the remaining baseband modulators and demodulators are similar in structure to the illustrated baseband modulator and demodulator, respectively.

The baseband modulator is included in the transmitter section 8 and comprises a primary modulator unit 100, a first directivity pattern generator 101 and a second directivity pattern generator 102. On the other hand, the baseband demodulator included in the receiver section 9 comprises a third directivity pattern generator 104, a fourth directivity pattern generator 105, and a primary demodulator 103.

As shown in FIG. 5, two of the directivity pattern generators are coupled to a single primary modulator in the baseband modulator and are coupled to a single demodulator in the baseband demodulator. From this fact, it is readily understood that the adaptive antenna device according to the embodiment of this invention generates directivity patterns or beams in accordance with two algorithms different from each other for a communication terminal. This means that, when more than three algorithms are used in a modification of the illustrated adaptive antenna device, the directivity pattern generators to be coupled to each of the primary modulator and the primary demodulator may be equal in number to the algorithms.

Now, description will be made about the structure of the transmitter section illustrated in FIG. 5. The primary modulator unit 100 is supplied from the base station control portion or the HWY interface portion with an input signal and subjects the input signal to coding processing for error correction and the like and primary modulation processing for CDMA spreading. An output signal from the primary modulator unit 100 is delivered to both the first and the second directivity pattern generators 101 and 102.

Both the first and the second directivity pattern generators 101 and 102 are controlled by the CPU 41 cooperating with the memory 40. The illustrated CPU 41 has first and second CPU units 108 and 109 coupled to first and second memory units 106 and 107, respectively. In the example being illustrated, the first and the second CPU units 108 and 109 are assumed to execute beam steering control and null steering control in accordance with a beam steering control algorithm and a null steering control algorithm, respectively.

Each of the first and the second directivity pattern generators 101 and 102 is given directivity pattern information according to a designated algorithm. Specifically, the first directivity pattern generator 101 is operable in response to the directivity pattern information given from the CPU unit 109 to carry out the beam steering control and generates the directivity pattern or beam which is related to the beam steering control. Likewise, the second directivity pattern generator 102 is operable in response to the directivity pattern information given from the CPU unit 108 to carry out the null steering control and generates the directivity pattern or beam which is related to the null steering control.

Next, description will be made about the structure of the receiver section illustrated in FIG. 5. The third and the fourth directivity pattern generators 104 and 105 are supplied with a reception signal received by each antenna element. It is to be noted that each antenna element is coupled to corresponding units of the T/R amplifier 7 and the radio modem 6, as will become clear later.

The third and the fourth directivity pattern generators 104 and 105 illustrated in FIG. 5 are coupled to the second and the first CPU units 109 and 108, respectively, and carry out reception processing of the reception signal under control of the second and the first CPU units 109 and 108, respectively. As a result, the third and the fourth directivity pattern generators 104 and 105 are operable in accordance with different algorithms determined for the beam and the null steering control, respectively, to produce processed signals. The processed signals are supplied to the primary demodulator 103 to be subjected to error correcting decoding and demodulating processing for CDMA despreading and the like. It is noted that the processed signals by the different algorithms is very low in correlation and may be often subjected to diversity combining, such as weighted combining and selective combining, before decoding.

As illustrated in FIG. 5, the CPU 41 is structured by two, namely, the first and the second CPU units 108 and 109 and by two, namely, the first and the second memory units 106 and 107 coupled to the first and the second CPU units 108 and 109, respectively. The first and the second memory units 106 and 107 are used as data storage regions for storing the algorithms determined for the corresponding CPU units 108 and 109 and data for controlling the directivity pattern. Specifically, the CPU units 108 and 109 and the memory units 106 and 107 correspond to the two algorithms used in the illustrated baseband modem 5. With this structure, it is possible to individually and independently control the two algorithms for single radio communication.

Figure 6:
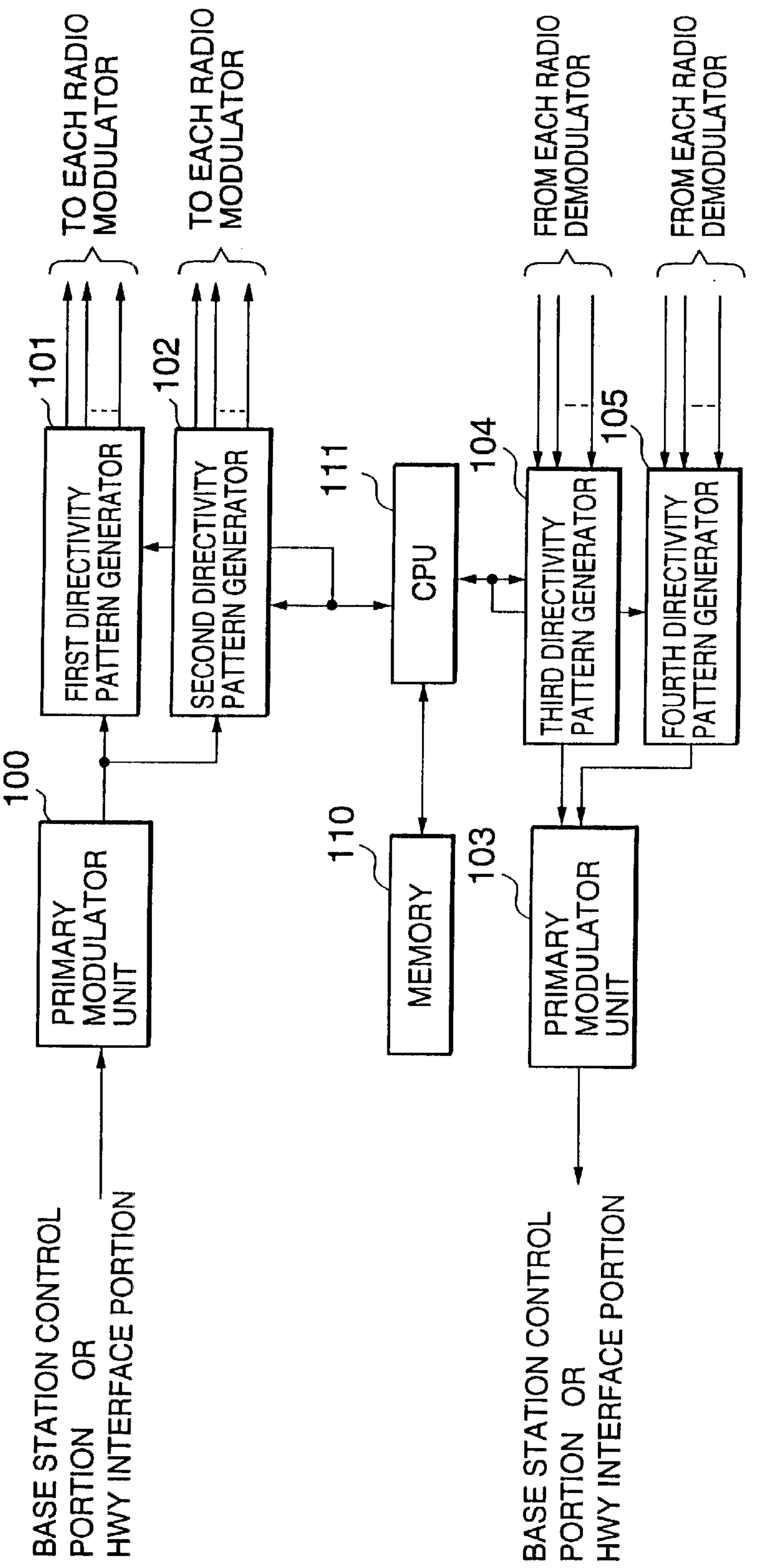
FIG. 6 shows a block diagram of a modification of the part illustrated in FIG. 5.
Figure 8:
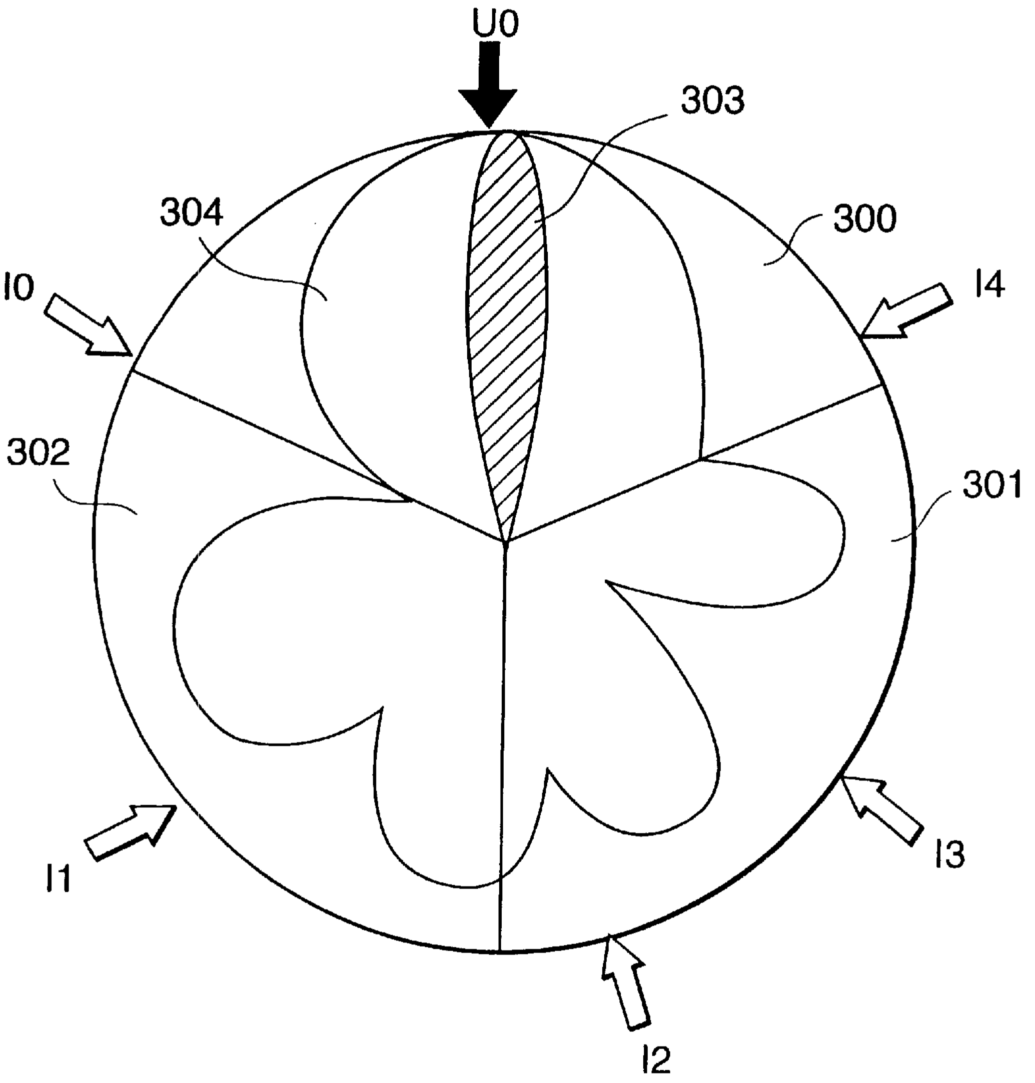
FIG. 8 diagrammatically shows an antenna directivity pattern generated by the base station according to this invention.

Referring to FIG. 8, description will be made about a modification of the baseband modem 5 illustrated in FIG. 5. The modified baseband modem 5 is similar in structure to that illustrated in FIG. 5 except that the CPU 41 and the memory 40 are structured by a single CPU and a single memory 40, respectively. In the example illustrated in FIG. 6, two kinds of algorithms run on the single CPU 40. This structure is effective to reduce an amount of hardware for a control portion to a half. In this connection, the illustrated CPU 41 processes the two algorithms in a time division fashion while the memory 40 is divided into two inside areas which are selectively used by each algorithm processing. Thus, the single CPU 41 and the single memory 40 are used in common on processing the two algorithms.

Figure 7:
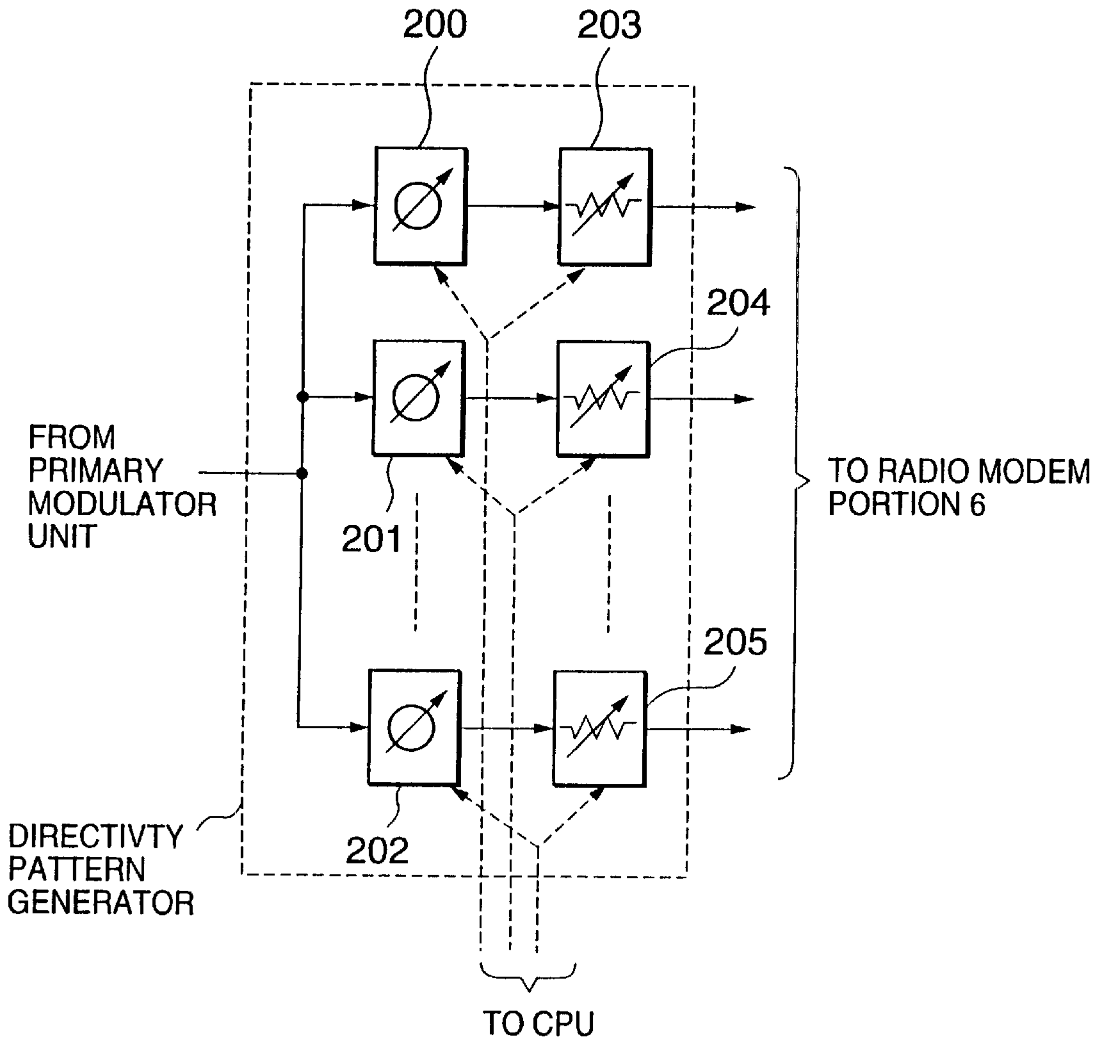
FIG. 7 shows a block diagram of a directivity pattern generator illustrated in FIG. 5.

Referring to FIG. 7, one of the directivity pattern generator which is used in the transmitter section 8 illustrated in FIG. 4 is exemplified so as to describe a function of the directivity pattern generator. In the receiver section 9, each directivity pattern generator is similar in structure except that each arrow head in FIG. 7 is directed in a reverse direction. Therefore, description will be omitted about each directivity pattern generator included in the receiver section 9.

Now, the directivity pattern generator illustrated in FIG. 7 comprises a plurality of phase shifters 200 to 202 connected in parallel to one another and a plurality of variable attenuators 203 to 205 connected in cascade to the respective phase shifters 200 to 202, respectively. Combinations of the phase shifters 200 to 202 and the variable attenuators 203 to 205 are supplied to a single input signal from the primary modulator and are equal in number to the antenna elements. The phase shifters 200 to 202 and the variable attenuators 203 to 205 are connected to the CPU 41 and serve to vary phase components and amplitude components of the input signal in response to the control signals delivered from the CPU 41. As a result, it is possible to control a directivity characteristic of a whole of the antenna array.

Subsequently, description will be made about a control principle of the directivity pattern by taking the receiver section as an example. The antenna elements in the antenna array 2 are regularly spaced apart from one another. Therefore, distances between the respective antenna elements and a communication terminal are accurately different from one anther. This means that, when an identical signal is transmitted from an antenna of the communication terminal and is received by the base station as received signals at the respective antenna elements, the received signals at the respective antenna elements have different phases and amplitudes.

For example, let a signal transmitted from the antenna of the communication terminal be received by two of the antenna elements in the base station as two received signals. It is assumed that the two received signals are given to the two directivity pattern generators through the receiver amplifier and the radio demodulator (FIG. 3). When the two received signals have the same amplitude and phases different from each other by 180°, both the received signals are cancelled by each other and the resultant base station is put in a state which is similar to the state of receiving no signal.

To the contrary, when the two received signals have the same phases and the same amplitudes, the base station is put in a state which is similar to the state of receiving a received signal of twice the amplitude. In this event, the base station receives the received signal having twice the amplitude and four times electric power.

Taking the above into consideration, the directivity pattern generators of the baseband demodulator in the base station are controlled so that all signals become the same phases and amplitudes as one another when the signals received by the antenna elements are given to the primary demodulator through the receiver amplifier, the radio demodulator, and the directivity pattern generators. With this structure, it is possible to reproduce a signal which has electric power exponentially proportional to the antenna elements of the base station when reception processing is carried out in the base station.

Furthermore, when the base station receives a signal transmitted from a desired communication terminal, the directivity pattern generators in the baseband demodulator of the base station are controlled so as to cancel any interference or jamming waves transmitted from any other communication terminals. This makes it possible to reproduce the desired signal by the receiving processing in the base station under good conditions following less interference waves.

Although the above-principal for controlling the directivity has been made as an example about the receiving processing in the base station, this applies to transmitting processing in the base stations.

Turning back to FIG. 7, the illustrated directivity pattern generator is illustrated in the form of a functional block and may be realized by a digital signal processor which can control phase and amplitude components subjected to digital signal processing and which may be substantially equivalent to the phase shifters and the attenuators.

Thus, it is possible to establish the adaptive antenna device according to this invention by including the CPU 41, the memory 40, and the directivity pattern generators each of which corresponds to a plurality of algorithms.

Referring to FIG. 8, description will be conceptually made about an antenna directivity pattern in the base station according to this invention. In FIG. 8, the antenna directivity pattern generated by the base station is diagrammatically shown in relation to arrival directions of a desired wave and interference waves. Herein, it is surmised that a communication terminal is moved within a service area (a cell) of the base station, communicating with the base station.

As mentioned before, the illustrated cell is divided into a plurality of sectors which are equal in number to three in FIG. 8. However, it is to be noted that this invention is not restricted to three sectors but may be applied to a system which has an optional number of the sectors.

In FIG. 8, the three sectors are designated by 300, 301, and 302 and the communication terminal is present within the sector 300. Furthermore, the arrival direction of the desired wave is depicted by U0 while the arrival directions of the interference waves are depicted by 10, 11, 12, 13, and 14 in FIG. 8.

The illustrated beam 303 shows a narrow beam which is generated in accordance with the algorithm for the beam steering control and which has a main lobe having a half-width narrower than 10°. On the other hand, the beam 304 shows a beam which is generated in accordance with the algorithm for the null steering control. Herein, it is assumed that each control is put into a converged state, namely, a stable state. Such a stable state is not varied in each beam.

Each of the beams 303 and 304 is changed in a manner illustrated in FIGS. 9 through 11 in response to variations of the desired wave and the interference waves, as will be mentioned later in detail. To this end, the adaptive antenna device according to this invention executes an operation illustrated in FIG. 12.

Figure 12:
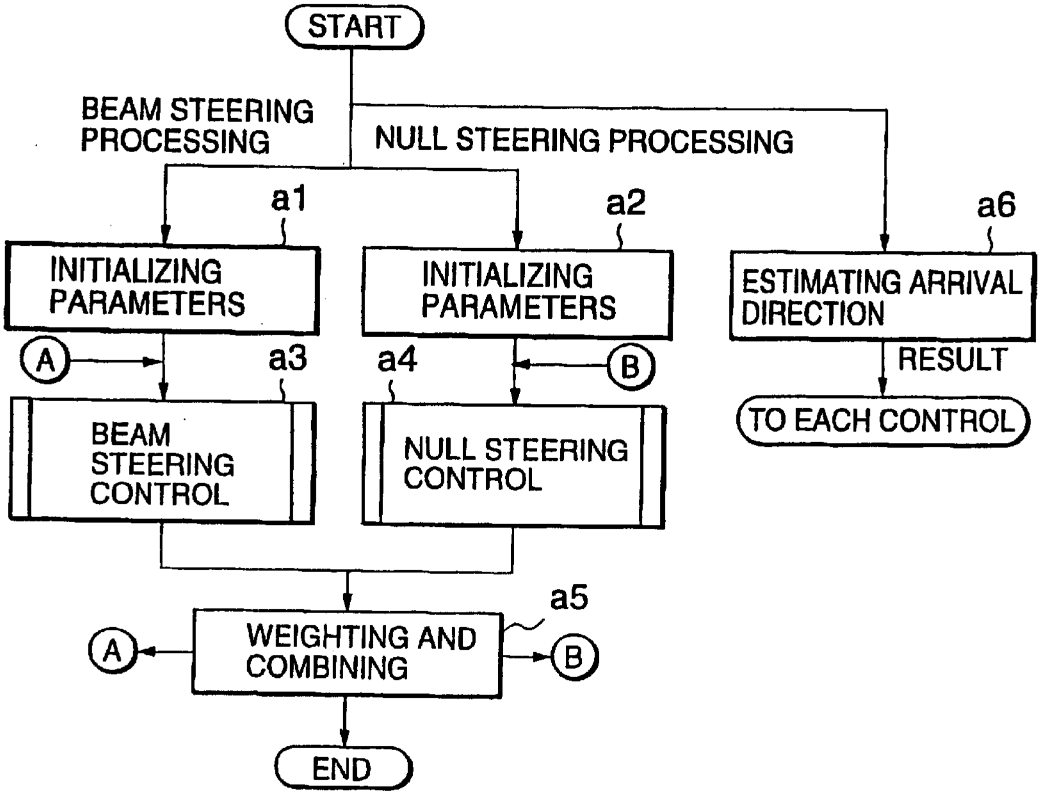
FIG. 12 shows a flow chart for use in describing a basic operation of the adaptive antenna device (receiver portion) according to this invention.

Referring to FIG. 12, description will be made about a basic control operation of the base station according to this invention. As shown in FIG. 12, the control operation is separated into three partial flows each of which may be carried out simultaneously or in a time division fashion made alternately at a very short time interval.

Among the three partial flow, one of the partial flows is for beam steering processing while another one is for null steering processing. The remaining partial flow is for estimating an arrival direction of each wave. In both the beam steering processing and the null steering processing, the two partial flows begin at initialization steps (steps a1 and a2) of initializing parameters used for each control operation. Thereafter, directivity control is carried out to generate beams in accordance with the control algorithms for the beam steering control and the null steering control (steps a3 and 34). The steps a3 and a4 are followed by a step a5 at which received waves are weighted and combined in accordance with evaluation functions determined in relation to reception strength and/or reception quality. Subsequently, each control operation is repeated in a similar manner by returning back to the beam steering control and the null steering control shown in the steps a3 and a4.

On the other hand, the arrival direction estimation flow is for estimating an arrival direction of a desired wave in response to amplitudes and phases of received waves that are received through different antenna elements (step a6). The results of the estimation are delivered to each control processing and used as an angle profile of parameter information in the beam steering control and the null steering control. A sequence of processing illustrated in FIG. 12 is finished when three antenna directivity control operations are converged and become stable.

Figure 13:
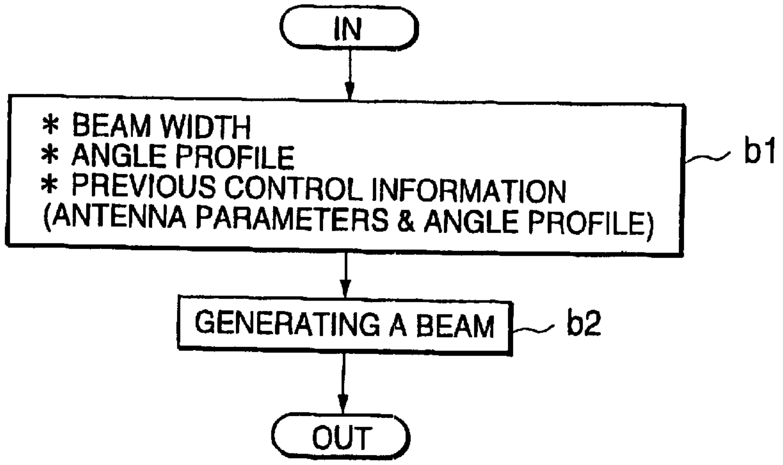
FIG. 13 shows a flow chart for use in describing a specific step illustrated in FIG. 12 in detail.

Referring to FIG. 13, the step a3 (illustrated in FIG. 12) for carrying out the beam steering control will be described in detail. Herein, it is to be noted that various kinds of the algorithms have been strictly proposed so as to carry out the beam steering control but a common operation in all of the algorithms alone will be mentioned in conjunction with FIG. 13, with small differences omitted from the description.

In FIG. 13, the beam steering control is started at a step b1 of providing a beam width, an angle profile for determining a beam direction, and previous control information which is used in the past when the control is continuously carried out in the past. The angle profile is determined by information obtained by estimating the arrival direction at the step a6 (FIG. 12). No previous control information is used when control operation is initially started or when control operation is restarted after the parameters are initialized. The step b1 is succeeded to a step b2 at which a desired beam is generated.

Figure 14:
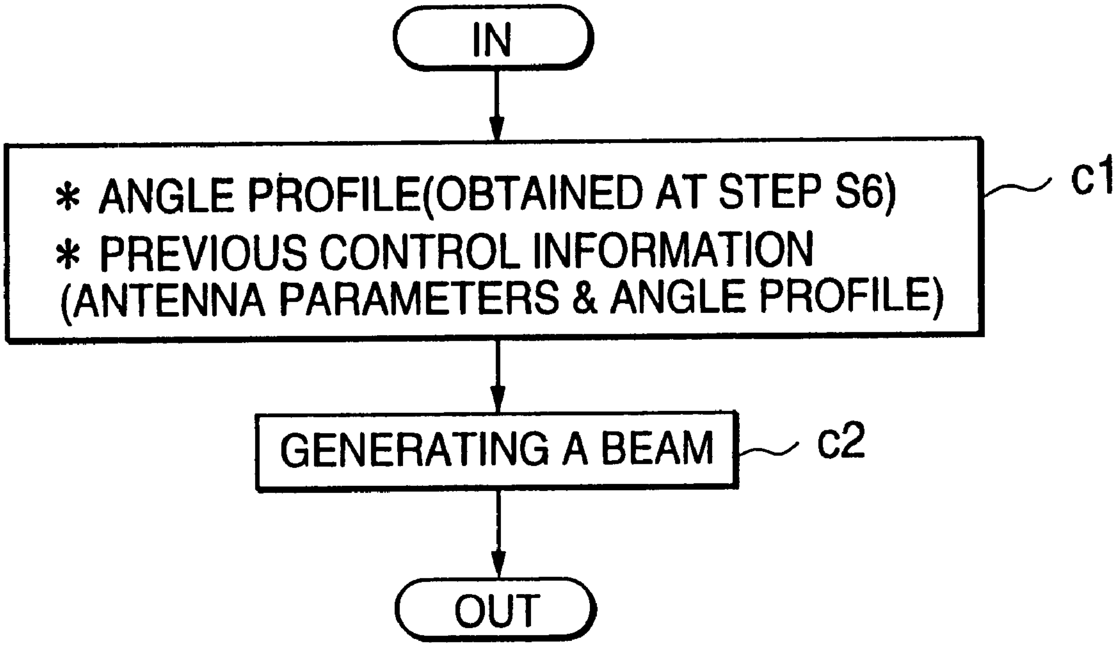
FIG. 14 shows a flow chart for use in describing another step illustrated in FIG. 12 in detail.

Referring to FIG. 14, the step a4 (illustrated in FIG. 12) for carrying out the null steering control will be described hereinafter. As shown in FIG. 14, the step a4 begins at a step c1 of providing an angle profile for determining a beam direction and previous control information which is used in the past when the null steering control is continuously carried out from the past. The previous control information may include previous antenna parameters and previous angle profile.

The step c1 is followed by a step c2 of generating a beam. Herein, it is noted that no parameter related to a beam width is used in the null steering control different from the beam steering control. The remaining parameters in the null steering control are similar to those in the beam steering control.

Each step illustrated in FIGS. 12 to 14 may be implemented either by a hardware circuit unit or by a software program.

Referring back to FIGS. 8 through 11, description will be made about a variation of the directivity pattern which is converged on the basis of directivity pattern control, as mentioned above. In FIGS. 8 through 11, it is assumed that the base station is located at each center of the circles (cells). As illustrated in FIG. 8, the desired wave is received from the arrival direction U0 which is covered with both the beams 303 and 304. Among them, the beam 303 is controlled by the beam steering control so that a maximum gain portion of the beam 303 is directed to the arrival direction U0 of the desired wave.

On the other hand, the beam 304 is shaped by the null steering control so that null points appear in the arrival directions 10, 11, 12, 13, and 14 of the interference waves. Simultaneously, the beam 304 is controlled to obtain a maximum quality of the desired wave by forming a lobe which has a high gain in the arrival direction U0 of the desired wave.

Figure 9:
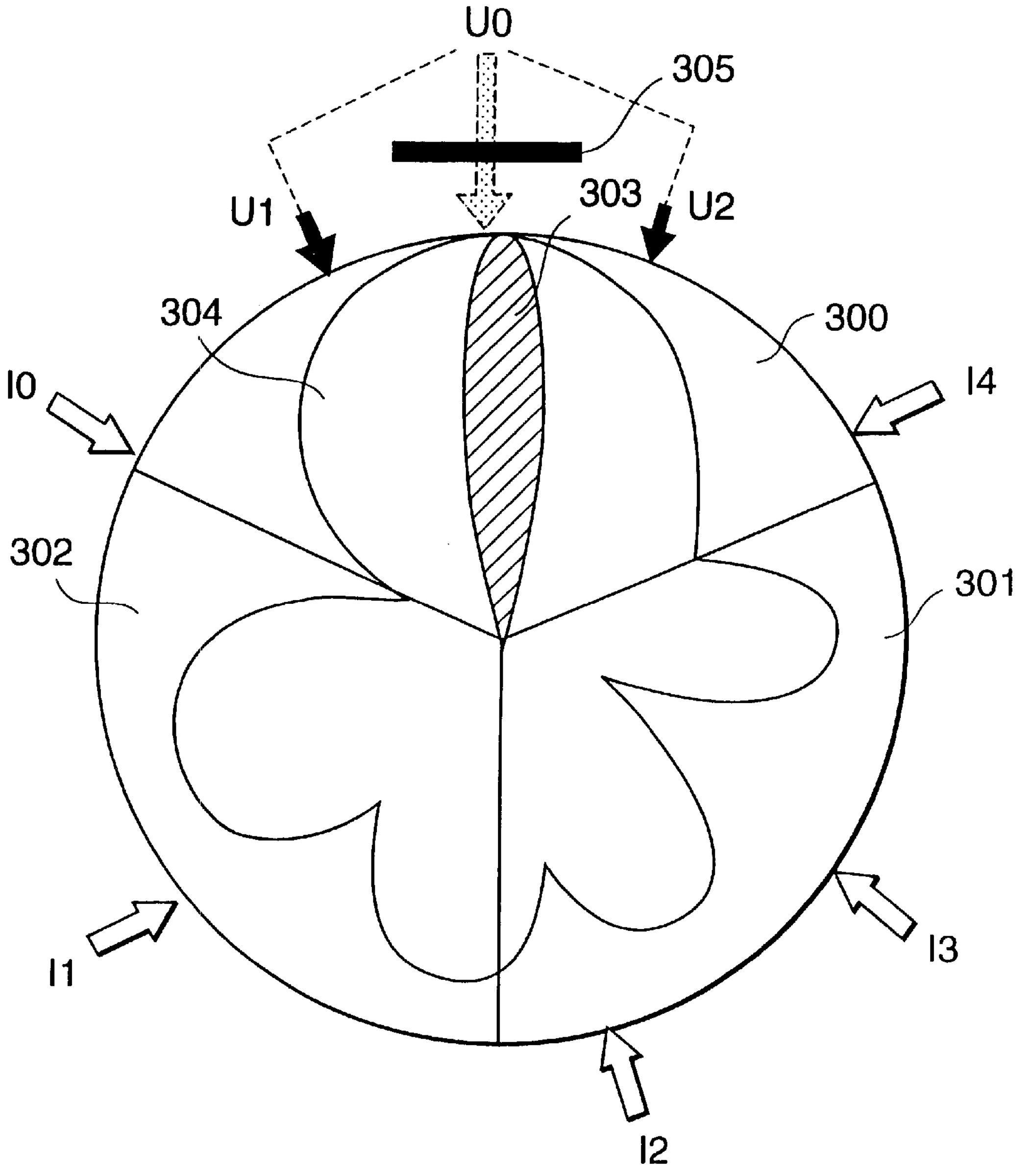
FIG. 9 shows a variation of an antenna directivity pattern which occurs when an obstacle appears.

Referring to FIG. 9, description will be made about the case where a rapid variation is caused to occur in a propagation characteristic between the communication terminal and the base station. In FIG. 9, it is assumed that an obstacle 305 appears between the communication terminal and the base station while the communication terminal is being moved. As shown in FIG. 9, the obstacle 305 intercepts the arrival direction U0 of the desired wave and the resultant desired wave is received from two arrival directions U1 and U2.

Suppose the beam width in the beam steering control can not be followed because the propagation characteristic is rapidly varied between the communication terminal and the base station. In other words, the beam width is kept at the converged state illustrated in FIG. 8 at this time instant Under the circumstances, the desired wave can not be received by the beam 303 any longer. But, the desired wave can be received by using the beam 304 by capturing the desired wave from the arrival directions U1 and U2. At the illustrated time instant, the beam 304 is not controlled at an optimum state in relation to the arrival directions U1 and U2 of the desired wave. However, it is possible to avoid a fatal damage such that communication is interrupted, when the receiving operation is carried out by the base station.

This is apparent from the fact that a group of paths which arrives from the communication terminal to the base station generally falls within an angle range of several tens of degrees, although the angle range depends on frequencies and a radius of each cell, and that a main lobe becomes wide in the null steering control. This is because directivity control based on the null steering control is mainly aimed to form a sharp null.

Figure 10:
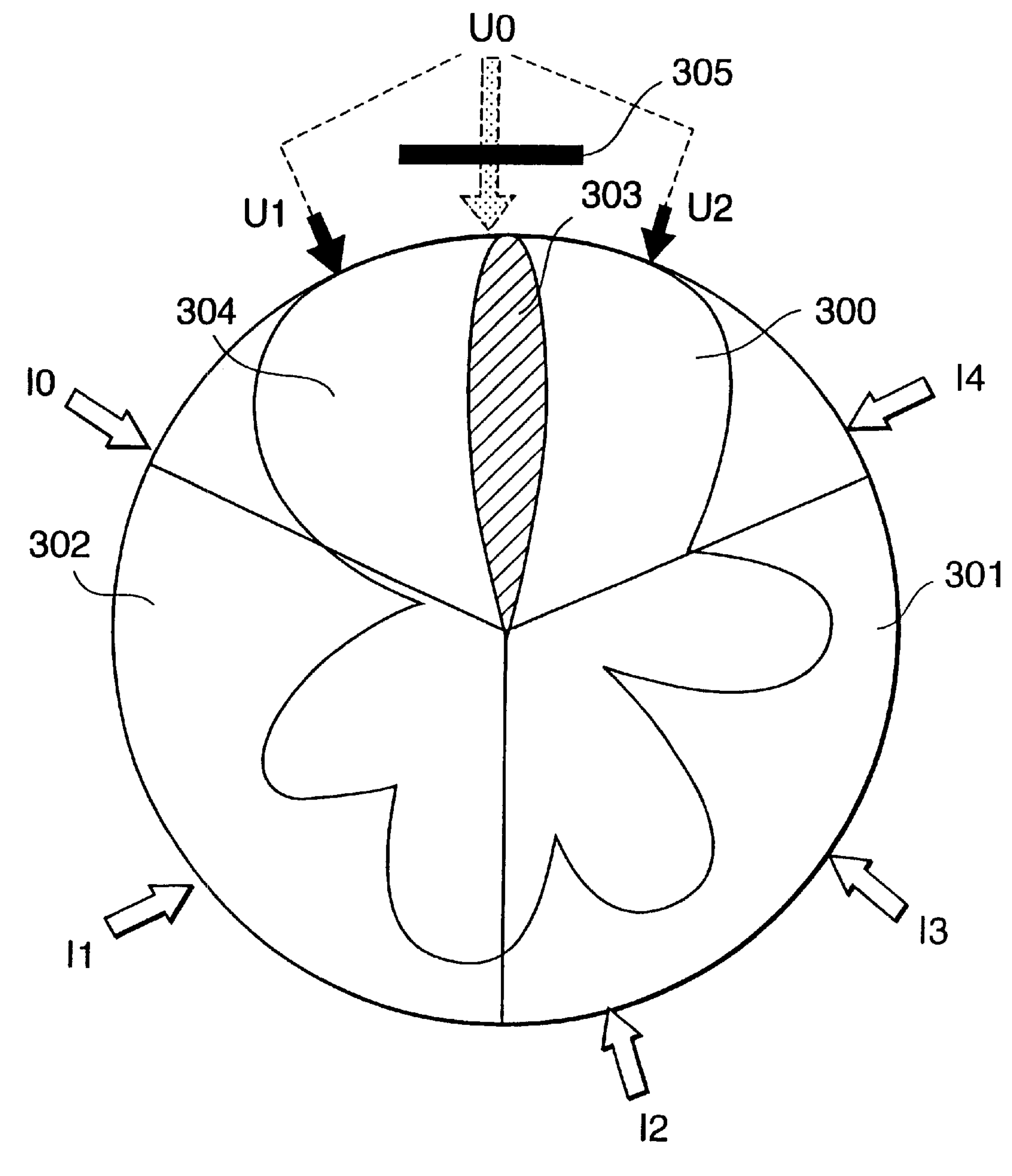
FIG. 10 shows the antenna directivity pattern according to this invention, which is varied to receive desired waves.

Referring to FIG. 10, illustration is made of a state wherein the beam 304 is controlled so that the desired wave can be received from the arrival directions U1 and U2 when a predetermined time lapses after the state of FIG. 9. As illustrated in FIG. 10, the main lobe of the beam 304 is expanded so as to receive the desired wave from the arrival directions U1 and U2. Consequently, the base station can continue the receiving operation by using the beam 304 for the time being.

Figure 11:
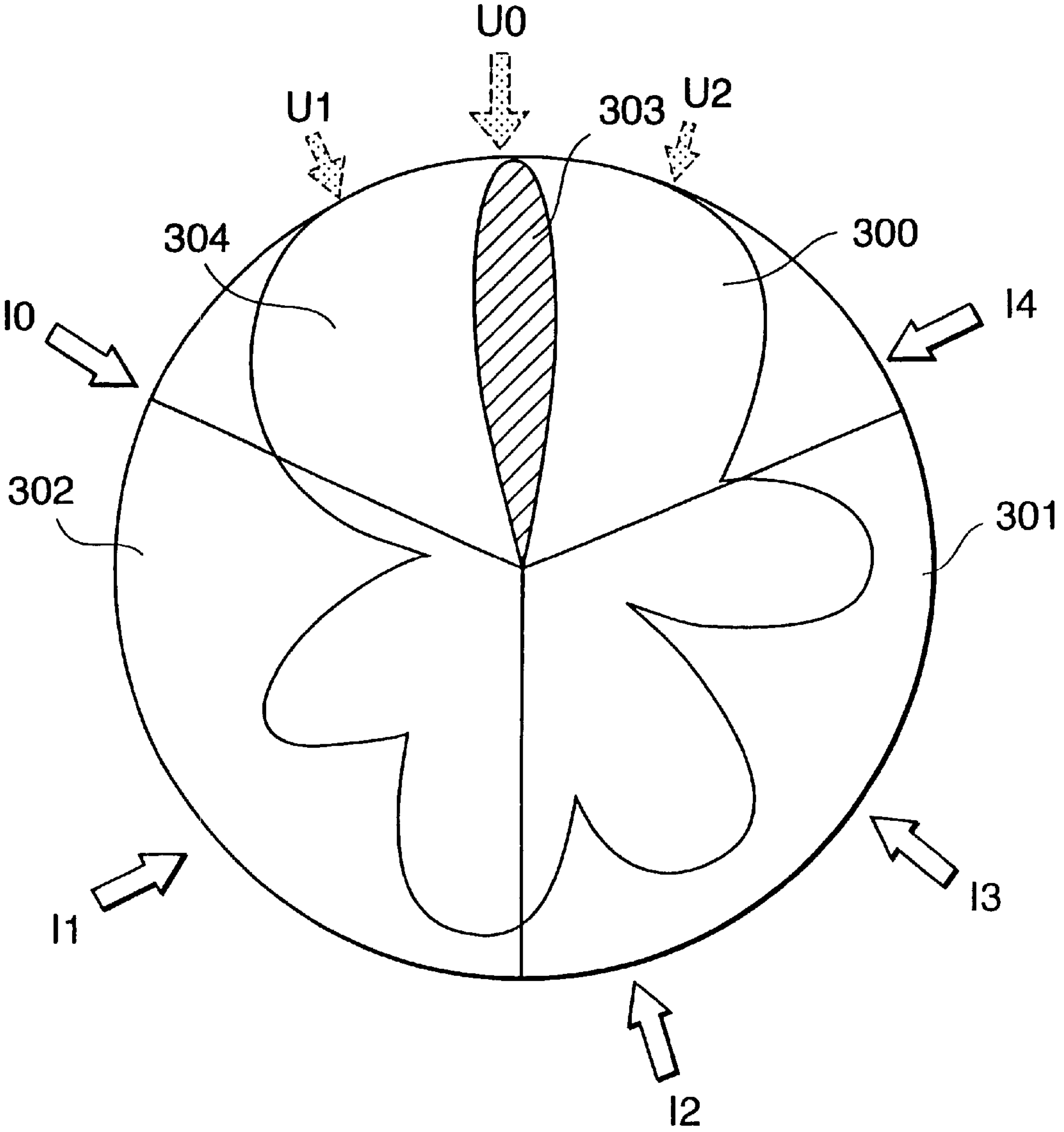
FIG. 11 shows a further variation of the antenna directivity pattern that appears when a short time lapses after the obstacle is removed.

Referring to FIG. 11, the obstacle 306 is removed from the state of FIG. 10 within a very short time. In this event, the desired wave from the arrival direction U0 can be captured by the beam 303 again. It is needless to say that the beam 304 can also capture the desired wave from the arrival direction U0, although an optimum state is not kept about the beam 304.

Thus, the adaptive antenna device according to this invention can realize the operation by executing the beam steering processing, the null steering processing, and the estimating processing of the arrival direction in parallel, by reflecting the results of the estimating processing on the beam steering processing and the null steering processing, and by weighting and combining the processing results of the beam steering processing and the null steering processing.

Figure 15:
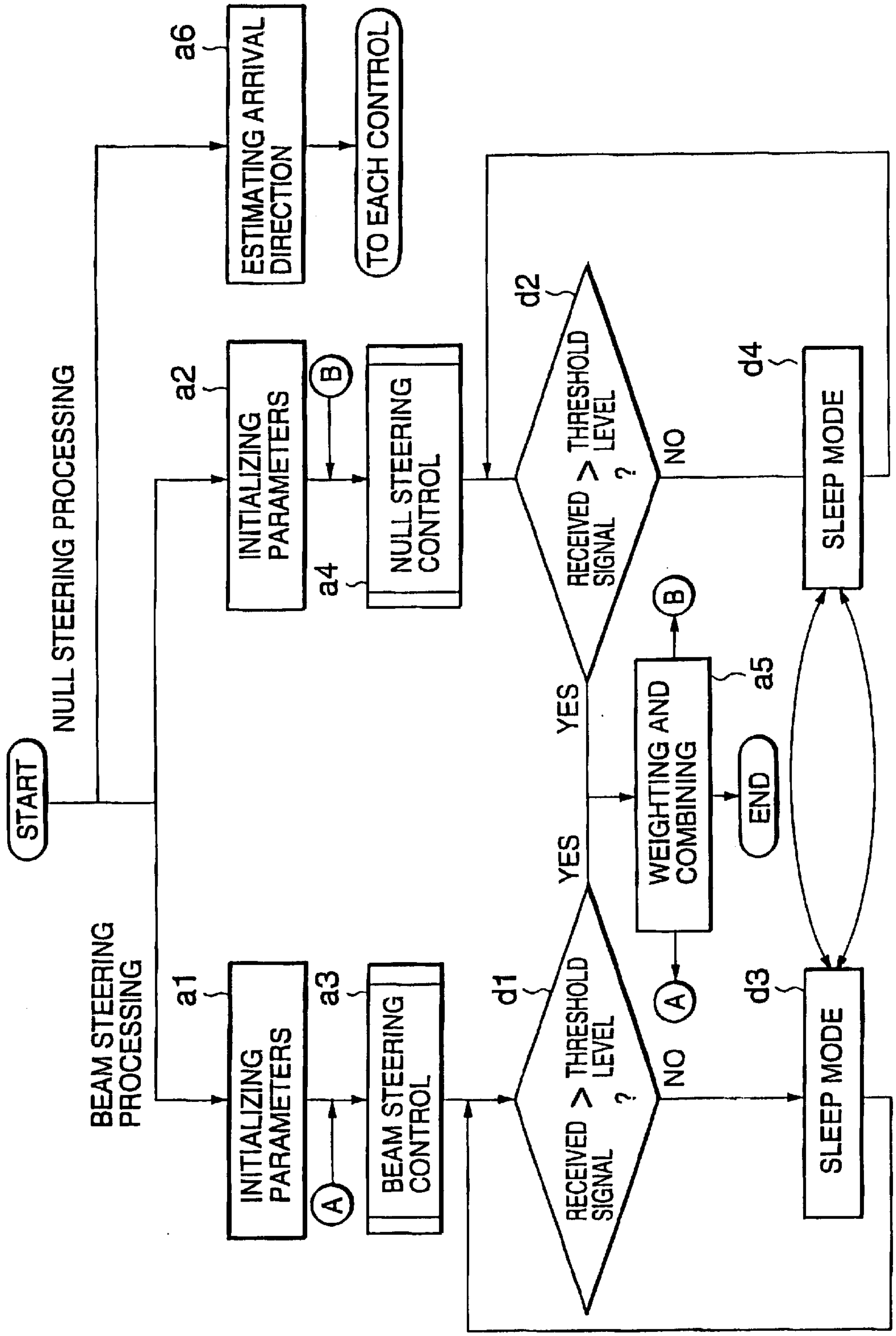
FIG. 15 shows a flow chart for use in describing another basic operation according to a second embodiment of this invention.

Referring to FIG. 15, description is made about an operation of an adaptive antenna device according to a second embodiment of this invention. The operation of the illustrated adaptive antenna device comprises steps which are similar to those illustrated in FIG. 12 and which are depicted by similar reference symbols or numerals. Specifically, the operation illustrated in FIG. 15 is different from that illustrated in FIG. 12 in that steps d1 and d2 are executed prior to the weighting and combining step a5 to determine whether or not the steps d1 and d3 are moved to steps d3 and d4, respectively.

In FIG. 15, control operation is separated at its beginning into three kinds of flows each of which is executed simultaneously or in a time division fashion alternately carried out at a very short time interval. One of the three kinds of the flows specifies beam steering control while another specifies null steering control. The remaining flow specifies processing for estimating an arrival direction. Like in FIG. 12, the parameters are initialized at the steps a1 and a2 in the beam and the null steering processing and are followed by the beam steering control and the null steering control steps a3 and a4, respectively. As a result, the directivity control operations are carried out at the steps a3 and a4 in accordance with the respective algorithms to generate the beams.

At the steps d1 and d2, signals received by the use of the directivity controlled beams are compared with threshold levels to detect whether or not the received signals exceed the threshold levels, respectively. If the received signals exceed the threshold levels, the steps d1 and d2 are followed by the weighting and combining step a5 which has been already mentioned before. Otherwise, the steps d1 and d2 are succeeded by the steps d3 and d4 at which operation is carried out in sleep modes in a manner to be described later, respectively. When each of the sleep mode is finished at each of the steps d3 and d4, operation is returned back to the step d1 or d2 and similar operation is repeated.

Figure 16:
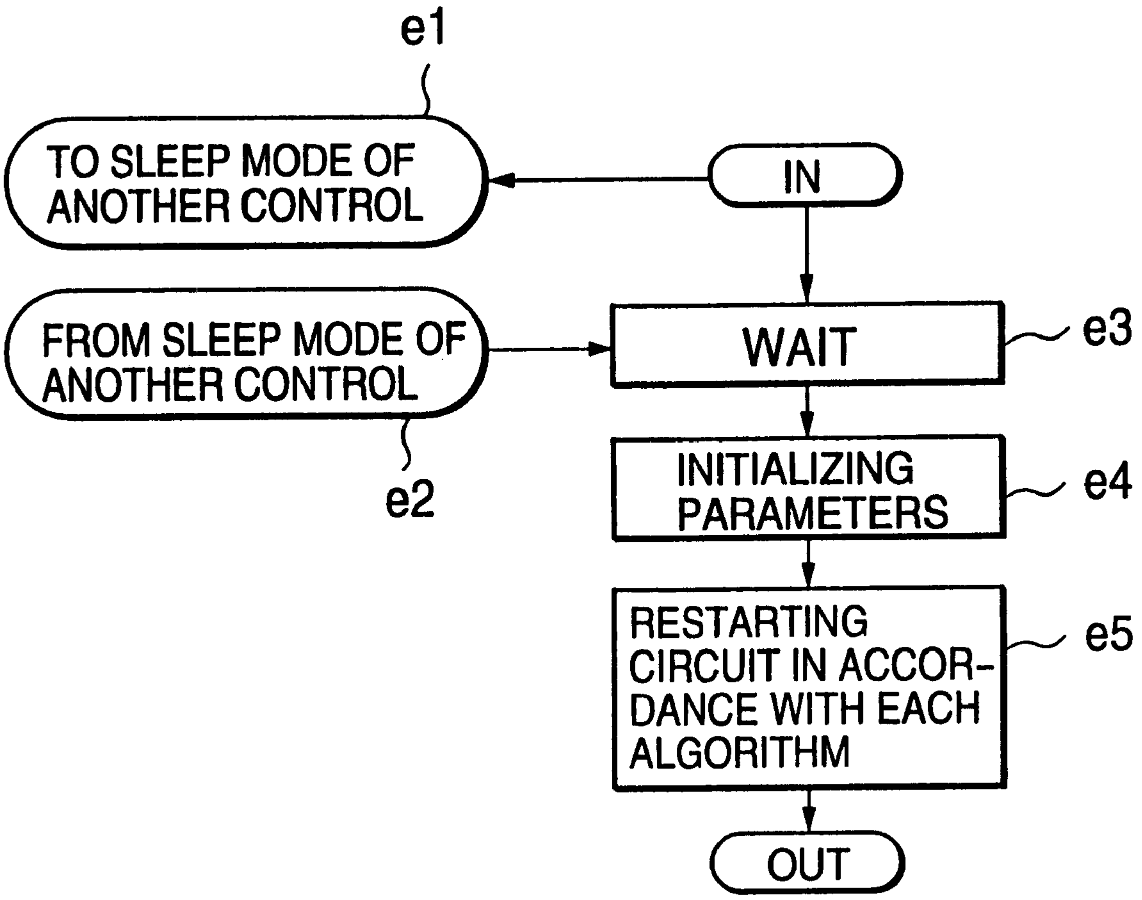
FIG. 16 shows a flow chart for use in describing a sleep mode illustrated in FIG. 15.

Referring to FIG. 16, the sleep mode is started at IN and is transmitted from one control side to another control side (step e1 or e2). Specifically, such sleep mode information is transmitted from the beam steering control side to the null steering control side or vice versa. After the sleep mode information is transmitted to another steering control, a waiting state is kept at a step e3.

When the sleep mode information is received during the waiting state, as shown at the step e3 in FIG. 16, the step e3 is quickly followed by a step e4, although no control operation is substantially carried out during the waiting state. This shows that, when a predetermined delay time lapses or the sleep mode information is received from another control, the waiting state is released and is succeeded by a step e4 of initializing parameters. Each control operation is restarted in accordance with each algorithm at a step e5 and, thereafter, the sleep mode of operation is finished.

With this structure, the adaptive antenna device according to the second embodiment of this invention can accomplish an operation by executing the beam steering processing, the null steering processing, and the estimating processing of the arrival direction in parallel and by reflecting the results of the estimating processing on the beam steering processing and the null steering processing. Thereafter, comparison is made between the processing results of the beam steering processing and the null steering processing and the predetermined threshold levels and the weighting and combining processing is executed when the processing results exceed the threshold levels. Otherwise, the weighting and combining processing is executed after the waiting state lasts for the predetermined time interval until the processing results exceed the threshold levels.

As mentioned before, this invention uses both a narrow beam generated by the beam steering control and a comparatively wide beam generated by the null steering control and receives signals by weighting and combining operation. Inasmuch as a kind of a backup beam is always formed, it is possible to provide a stable quality of service in the mobile communication system without any fatal damage, such as communication interruption, even when the propagation characteristic is rapidly varied.

By using the narrow beam according to the beam steering control and the wide beam according to the null steering control in common, received waves are obtained from independent beams based on the different control. Thus obtained received waves are low in path correlation and serve to determine optimum paths based on the respective control. As a result, a very high diversity gain can be accomplished in the above-mentioned manner.

Furthermore, the adaptive antenna device according to this invention is not lowered in its performance, in spite of the fact that receiving operation is executed by simultaneously using a plurality of beams. This is because use is made about both the beam steering control and the null steering control which are highly independent of each other and which are different in property from each other and optimum solutions can be combined in the respective control.

Moreover, when either one of the beam steering control and the null steering control does not contribute to a receiving operation, delay processing due to the sleep mode is executed for a predetermined time which serves to provide a hysteresis. With this structure, it is possible to avoid divergence of the control in the adaptive antenna device because response does not become excessively keen to an instantaneous variation of the propagation characteristic.

While this invention has thus far been described in conjunction with a few embodiments thereof, it will be readily possible for those skilled in the art to put this invention into practice in various other manners. For example, although the beam steering control and the null steering control have been executed in the above-mentioned embodiments, this invention may not be always restricted to the above-exemplified control but may be applied to an adaptive antenna device which is operable in accordance with a plurality of algorithms different from each other.

What is claimed is:

1. An adaptive antenna device which comprises a plurality of antenna arrays and a base station apparatus coupled to the antenna arrays, each of the antenna arrays having a plurality of antenna elements spatially arranged, the base station apparatus comprising:

combining means for forming a directivity pattern which is combined by varying an amplitude and a phase of each radio signal received by and transmitted from the antenna elements so that radio energy is increased towards a designated direction of a communication radio wave and is canceled toward a range and a direction of a jamming wave; the combining means comprising:

beam steering antenna pattern control means for forming a narrow beam to control an antenna gain so that a maximum portion of the antenna gain is directed to a received direction of the communication radio wave;

null steering antenna pattern control means for carrying out a control operation such that an antenna gain has a null portion directed toward a received direction of the jamming wave and concurrently has a high gain portion of the antenna gain directed toward the received direction of the communication radio wave; and weighting means for weighting a received signal in accordance with a beam obtained by the beam steering antenna pattern control and with a beam obtained by the null steering antenna steering control, wherein the combining means forms said combining directivity pattern for transmitting by simultaneously combining said narrow beam from said beam steering antenna pattern control means and said antenna gain from said null steering antenna pattern control means in accordance with an evaluation function determined in relation to reception.

2. An adaptive antenna device as claimed in claim 1, wherein each of the beam steering antenna pattern control means comprises:

arrival direction estimation means for performing each of the beam steering antenna pattern control and the null steering antenna pattern control simultaneously or in a time division fashion at a very small time interval, so as to estimate a direction of a desired wave from different amplitudes and phases of the received radio waves received from the plurality of the antenna arrays and to produce results of the estimation;

the results of the estimation being defined as an angle profile which is representative of parameter information of the beam steering and the null steering antenna pattern control means.

3. An adaptive antenna device as claimed in claim 1, wherein the beam steering antenna pattern control means comprises:

reception means for receiving, as control information, parameters which include a beam width in question and an angle profile for determining the direction of the beam and which selectively include a previous beam width and a previous angle profile referenced only when control operation is consecutively carried out from the past; and means for attaining the antenna pattern on the basis of the control information.

4. An adaptive antenna device as claimed in claim 1, wherein the null steering antenna pattern control means comprises:

receiving means for receiving, as control information, parameters which include an angle profile for determining a beam direction and a previous angle profile which is referenced only when control operation is consecutively carried out from the past; and means for attaining the antenna pattern on the basis of the control information.

5. An adaptive antenna device as claimed in claim 1, further comprising:

comparing means for comparing, with each of predetermined threshold levels, each of a reception signal received through a beam patterned by the beam steering directivity control and another reception signal received through a beam patterned by the null steering directivity control, to produce a result signal representative of a result of comparison; and combining means for combining the reception signal and another reception signal after each of the reception signal and another reception signal is weighted only when each signal exceeds the predetermined threshold level; and repeating means for repeating the combining operation after delay time processing is carried out to delay a predetermined time.

6. An adaptive antenna device as claimed in claim 1, wherein a structure for forming a combined directivity characteristic in the base station comprises:

a portion that has a directivity generation part for the beam steering control, a CPU, and a memory; and another portion that has a directivity generation part for the null steering control, another CPU, and another memory.

7. An adaptive antenna device which comprises a plurality of antenna arrays and a base station apparatus coupled to the antenna arrays, each of the antenna arrays having a plurality of antenna elements spatially arranged, the base station apparatus comprising:

a first directivity pattern generator, operable in accordance with a first algorithm, for generating a first transmission beam which has a first directivity pattern determined by the first algorithm;

a second directivity pattern generator, operable in accordance with a second algorithm different from the first algorithm, for generating a second transmission beam which has a second directivity pattern determined by the second algorithm; and a combining unit for combining the first transmission beam with the second transmission beam to form a combined directivity pattern in accordance with an evaluation function determined in relation to reception.

8. An adaptive antenna device as claimed in claim 7, wherein the first algorithm and the second algorithm are used for executing beam steering control and null steering control, respectively.

9. An adaptive antenna device as claimed in claim 8, wherein the combining unit is operable to vary an amplitude and a phase of each radio signal received by and transmitted from the antenna elements so that radio energy is increased towards a designated direction of a communication radio wave and is canceled towards a range and a direction of a jamming wave.

10. An adaptive antenna device as claimed in claim 7, the base station apparatus further comprising:

a third directivity pattern generator for carrying out receiving operation of a received signal in accordance with the first algorithm to produce a first processed signal;

a fourth directivity pattern generator for carrying out receiving operation of the received signal in accordance with the second algorithm to produce a second processed signal; and a control unit for controlling the third and the fourth directivity pattern generators so that the first and the second processed signals become optimum in phases and amplitudes.

11. An adaptive antenna device as claimed in claim 10, wherein the first and the second algorithms are determined for beam steering control and null steering control, respectively.

12. A method of controlling an adaptive antenna device, comprising:

generating a first transmission beam of a first directivity pattern in accordance with a first algorithm;

generating a second transmission beam of a second directivity pattern in accordance with a second algorithm different from the first algorithm;

combining the first and second transmission beams to produce a combined beam of a combined directivity pattern; and controlling the combined directivity pattern in consideration of an arrival direction of a desired wave and arrival directions of jamming waves.

13. A method as claimed in claim 12, wherein the first algorithm is determined for beam steering control while the second algorithm is determined for null steering control.

14. A method as claimed in claim 13, wherein the controlling step is carried out so that the first beam has a maximum antenna gain in the arrival direction of the desired wave while the second beam has a minimum antenna gain in the arrival directions of the jamming waves.

15. A method as claimed in claim 12, wherein the controlling step comprises the steps of;

estimating the arrival directions of the desired wave and the jamming waves;

carrying out beam steering processing to produce the first beam;

carrying out null steering processing to produce the second beam; and weighting and combining both the first and the second beams to obtain the combined beam with reference to results of the estimating.

16. A method as claimed in claim 12, wherein the controlling step comprises the steps of:

estimating the arrival directions of the desired wave and the jamming waves;

carrying out beam steering processing to produce the first beam;

carrying out null steering processing to produce the second beam;

comparing, with threshold levels, first and second signals representative of the first and the second beams;

weighting and combining both the first and the second signals to obtain the combined beam with reference to results of the estimating when the first and the second signals exceed the threshold levels, respectively, and, otherwise, carrying out a sleep mode.

* * * * *